US008464849B2

(12) United States Patent
Nanri et al.

(10) Patent No.: US 8,464,849 B2
(45) Date of Patent: Jun. 18, 2013

(54) DISK BRAKE

(75) Inventors: Keisuke Nanri, Kanagawa (JP); Kimiyasu Kono, Kanagawa (JP)

(73) Assignee: Hitachi Automotive Systems, Ltd., Kanagawa (JP)

( * ) Notice: Subject to any disclaimer, the term of this patent is extended or adjusted under 35 U.S.C. 154(b) by 652 days.

(21) Appl. No.: 12/656,390

(22) Filed: Jan. 28, 2010

(65) Prior Publication Data

US 2010/0194056 A1 Aug. 5, 2010

(30) Foreign Application Priority Data

Jan. 30, 2009 (JP) ................................. 2009-020760

(51) Int. Cl.
*F16D 65/20* (2006.01)
(52) U.S. Cl.
USPC .......................... 188/72.4; 188/71.8; 277/587
(58) Field of Classification Search
USPC .......................... 188/72.1–72.4; 277/439, 587
See application file for complete search history.

(56) References Cited

U.S. PATENT DOCUMENTS

| | | | | |
|---|---|---|---|---|
| 4,194,597 | A | * | 3/1980 | Evans et al. ................. 188/73.38 |
| 5,325,940 | A | * | 7/1994 | Rueckert et al. ............. 188/71.8 |
| 6,347,689 | B1 | * | 2/2002 | Ohishi .......................... 188/72.4 |
| 2003/0024777 | A1 | * | 2/2003 | Kurimoto et al. ............ 188/72.3 |

FOREIGN PATENT DOCUMENTS

| | | |
|---|---|---|
| DE | 43 31 281 C1 | 4/1995 |
| DE | 100 38 892 A1 | 3/2002 |
| EP | 1 643 152 A2 | 4/2006 |
| JP | 2006-105169 | 4/2006 |
| WO | WO-2007/125086 A1 | 11/2007 |

OTHER PUBLICATIONS

Extended European Search Report, App. No. 10151923.9-2423, May 11, 2010 (6 pages).

* cited by examiner

*Primary Examiner* — Christopher Schwartz
(74) *Attorney, Agent, or Firm* — Rader, Fishman & Grauer PLLC

(57) ABSTRACT

A disk brake including: a brake pad; a piston; a cylinder bore; an annular sealing groove formed on the cylinder bore; and a rectangular piston seal fitted into the sealing groove sealing between the piston and the cylinder bore, wherein the sealing groove includes: a bottom surface portion inclined as the sealing groove expands its diameter; a lateral surface portion that extends from one end of the bottom surface portion, the one end being a side where the sealing groove has the maximum diameter; and a chamfered portion, and wherein an inclined angle of the bottom surface portion is 2 to 8 degrees, an angle between the bottom surface portion and the lateral surface portion is 82 to 89 degrees, and with the piston installed into the cylinder bore, the piston seal abuts against the bottom surface portion and the lateral surface portion of the sealing groove.

20 Claims, 7 Drawing Sheets

FIG. 6

Interference: 2%

| α \ β | 80° | 81° | 82° | 83° | 84° | 85° | 86° | 87° | 88° | 89° | 90° |
|---|---|---|---|---|---|---|---|---|---|---|---|
| 2° | − | − | − | − | − | − | − | − | ○ 0° | ○ 1° | × 2° |
| 3° | − | − | − | − | − | − | − | ○ 0° | ○ 1° | × 2° | × 3° |
| 4° | − | − | − | − | − | − | ○ 0° | ○ 1° | ○ 2° | × 3° | × 4° |
| 5° | − | − | − | − | − | ○ 0° | ○ 1° | ○ 2° | × 3° | × 4° | × 5° |
| 6° | − | − | − | − | × 0° | × 1° | × 2° | × 3° | × 4° | × 5° | × 6° |
| 7° | − | − | − | × 0° | × 1° | × 2° | × 3° | × 4° | × 5° | × 6° | × 7° |
| 8° | − | − | × 0° | × 1° | × 2° | × 3° | × 4° | × 5° | × 6° | × 7° | × 8° |
| 9° | − | × 0° | × 1° | × 2° | × 3° | × 4° | × 5° | × 6° | × 7° | × 8° | × 9° |
| 10° | × 0° | × 1° | × 2° | × 3° | × 4° | × 5° | × 6° | × 7° | × 8° | × 9° | ×10° |

Interference: 3%

| α \ β | 80° | 81° | 82° | 83° | 84° | 85° | 86° | 87° | 88° | 89° | 90° |
|---|---|---|---|---|---|---|---|---|---|---|---|
| 2° | − | − | − | − | − | − | − | − | ○ 0° | ○ 1° | × 2° |
| 3° | − | − | − | − | − | − | − | ○ 0° | ○ 1° | ○ 2° | × 3° |
| 4° | − | − | − | − | − | − | ○ 0° | ○ 1° | ○ 2° | × 3° | × 4° |
| 5° | − | − | − | − | − | ○ 0° | ○ 1° | ○ 2° | × 3° | × 4° | × 5° |
| 6° | − | − | − | − | × 0° | × 1° | × 2° | × 3° | × 4° | × 5° | × 6° |
| 7° | − | − | − | × 0° | × 1° | × 2° | × 3° | × 4° | × 5° | × 6° | × 7° |
| 8° | − | − | × 0° | × 1° | × 2° | × 3° | × 4° | × 5° | × 6° | × 7° | × 8° |
| 9° | − | × 0° | × 1° | × 2° | × 3° | × 4° | × 5° | × 6° | × 7° | × 8° | × 9° |
| 10° | × 0° | × 1° | × 2° | × 3° | × 4° | × 5° | × 6° | × 7° | × 8° | × 9° | ×10° |

Interference: 4%

| α \ β | 80° | 81° | 82° | 83° | 84° | 85° | 86° | 87° | 88° | 89° | 90° |
|---|---|---|---|---|---|---|---|---|---|---|---|
| 2° | − | − | − | − | − | − | − | − | ○ 0° | ○ 1° | × 2° |
| 3° | − | − | − | − | − | − | − | ○ 0° | ○ 1° | ○ 2° | × 3° |
| 4° | − | − | − | − | − | − | ○ 0° | ○ 1° | ○ 2° | ○ 3° | × 4° |
| 5° | − | − | − | − | − | ○ 0° | ○ 1° | ○ 2° | ○ 3° | × 4° | × 5° |
| 6° | − | − | − | − | × 0° | × 1° | × 2° | × 3° | × 4° | × 5° | × 6° |
| 7° | − | − | − | × 0° | × 1° | × 2° | × 3° | × 4° | × 5° | × 6° | × 7° |
| 8° | − | − | × 0° | × 1° | × 2° | × 3° | × 4° | × 5° | × 6° | × 7° | × 8° |
| 9° | − | × 0° | × 1° | × 2° | × 3° | × 4° | × 5° | × 6° | × 7° | × 8° | × 9° |
| 10° | × 0° | × 1° | × 2° | × 3° | × 4° | × 5° | × 6° | × 7° | × 8° | × 9° | ×10° |

Interference: 5%

| α \ β | 80° | 81° | 82° | 83° | 84° | 85° | 86° | 87° | 88° | 89° | 90° |
|---|---|---|---|---|---|---|---|---|---|---|---|
| 2° | − | − | − | − | − | − | − | − | ○ 0° | ○ 1° | × 2° |
| 3° | − | − | − | − | − | − | − | ○ 0° | ○ 1° | ○ 2° | × 3° |
| 4° | − | − | − | − | − | − | ○ 0° | ○ 1° | ○ 2° | ○ 3° | × 4° |
| 5° | − | − | − | − | − | ○ 0° | ○ 1° | ○ 2° | ○ 3° | ○ 4° | × 5° |
| 6° | − | − | − | − | ○ 0° | ○ 1° | ○ 2° | ○ 3° | ○ 4° | × 5° | × 6° |
| 7° | − | − | − | ○ 0° | ○ 1° | ○ 2° | ○ 3° | ○ 4° | × 5° | × 6° | × 7° |
| 8° | − | − | ○ 0° | ○ 1° | ○ 2° | ○ 3° | ○ 4° | × 5° | × 6° | × 7° | × 8° |
| 9° | − | × 0° | × 1° | × 2° | × 3° | × 4° | × 5° | × 6° | × 7° | × 8° | × 9° |
| 10° | × 0° | × 1° | × 2° | × 3° | × 4° | × 5° | × 6° | × 7° | × 8° | × 9° | ×10° |

FIG. 7

| | β | α | |
|---|---|---|---|
| | 2%:3%:4%:5% | Interference | |

| α\β | 80° | 81° | 82° | 83° | 84° | 85° | 86° | 87° | 88° | 89° | 90° |
|---|---|---|---|---|---|---|---|---|---|---|---|
| 2° | — | — | — | — | — | — | — | — | O/O/O/O | O/O/O/O | X/X/X/X |
| 3° | — | — | — | — | — | — | — | O/O/O/O | O/O/O/O | O/O/O/O | X/X/X/X |
| 4° | — | — | — | — | — | — | O/O/O/O | O/O/O/O | O/O/O/O | O/O/X/X | X/X/X/X |
| 5° | — | — | — | — | — | O/O/O/O | O/O/O/O | O/O/O/O | O/O/O/O | O/X/X/X | X/X/X/X |
| 6° | — | — | — | — | O/X/X/X | O/O/X/X | O/O/O/X | O/O/X/X | O/O/X/X | X/X/X/X | X/X/X/X |
| 7° | — | — | — | O/X/X/X | O/X/X/X | O/X/X/X | O/X/X/X | O/X/X/X | X/X/X/X | X/X/X/X | X/X/X/X |
| 8° | — | — | O/X/X/X | O/X/X/X | X/X/X/X | X/X/X/X | O/X/X/X | X/X/X/X | X/X/X/X | X/X/X/X | X/X/X/X |
| 9° | — | X/X/X/X | X/X/X/X | X/X/X/X | X/X/X/X | X/X/X/X | X/X/X/X | X/X/X/X | X/X/X/X | X/X/X/X | X/X/X/X |
| 10° | X/X/X/X | X/X/X/X | X/X/X/X | X/X/X/X | X/X/X/X | X/X/X/X | X/X/X/X | X/X/X/X | X/X/X/X | X/X/X/X | X/X/X/X |

O Contact Condition Satisfied
× Contact Condition Not Satisfied
— Excluded

DISK BRAKE

BACKGROUND OF THE INVENTION

1. Field of the Invention

The present invention relates to a hydraulic disk brake.

2. Description of the Related Art

An example of hydraulic disk brakes in which to be applied to braking devices of a vehicle such as automobiles, autobicycles, etc. will be explained. The hydraulic disk brake comprises: a disk rotor that rotates together with a wheel; a pair of brake pads arranged at each side of the disk rotor; a caliper provided with a cylinder bore that faces the rear side of the brake pad, the caliper being supported on a side of a vehicle body; and a piston that is slidably inserted into the cylinder bore so as to press the brake pads to the disk rotor. The piston moves forward with hydraulic pressure supplied from a hydraulic pressure source such as a master cylinder to the cylinder bore, whereby braking force will be generated by pressing the brake pads against the disk rotor.

In general, as shown, for example, in Japanese Patent Application Laid-Open No. 2006-105169 (hereinafter referred to as Patent Document 1), a piston seal that is rectangular in section and made of an elastic material such as EPDM (ethylene-propylene rubber) is adapted to seal between a cylinder bore and a piston of a hydraulic disk brake.

Conventional piston seals will be discussed with reference to FIGS. 8 to 13. As shown in FIG. 10, a piston seal 1 is fitted into a sealing groove 3, the sealing groove 3 being an inner periphery groove in a rectangular section and being formed on an inner periphery of a cylinder bore 2. Further, the piston seal 1 is attached to an external periphery of a piston 4 so as to seal between the cylinder bore 2 and the piston 4. In the sealing groove 3, its bottom surface portion 3A is formed so as to make a diameter of the sealing groove 3 expanded as moving toward an opening of the cylinder bore 2 (left side in FIG. 10) whereby the sealing groove 3 is formed approximately in a trapezoidal section. Moreover, dimension of the sealing groove 3 in an axial direction is formed to be larger than the one of the piston seal 1. When the piston seal 1 is fitted into the sealing groove 3 as shown in FIG. 9, the piston seal 1 will abut against a lateral surface portion 3B placed on an opening side of the cylinder bore 2 due to an inclination of the bottom surface portion 3A of the sealing groove 3. The piston seal 1 is thus deformed along the inclination of the bottom surface portion 3A whereby the inner peripheral surface thereof will be tapered. By forming the inner peripheral surface of the piston seal 1 into the tapered configuration, it is possible to enhance adhesive properties between the piston seal 1 and the piston 4 while being able to reduce sliding-resistance therebetween. At each marginal portion of the sealing groove 3, chamfered portions 5, 6 are formed.

When braking is applied, the piston 4 moves forward by hydraulic pressure supplied into the cylinder bore 2, whereby the piston seal 1 is elastically deformed in a left-sided direction along the chamfered portion 5. On the other hand, when the braking is released, the piston 4 is adapted to move backward in a right-sided direction due to a rollback function to which the elastic quality of the piston seal 1 is participated. Here, in case brake pads are worn down, the piston 4 is adapted to move forward while braking is applied only for an amount where the brake pads are worn down. In the above condition, the piston 4 is adapted to slide relative to the piston seal 1. This makes possible to compensate the brake pads' wear making a pad clearance adjustable to a constant amount.

In the above-described conventional disk brake provided with the piston seal, however, the following problems may occur. For example, as shown in FIG. 8, in case that an inclined angle of the bottom surface portion 3A of the sealing groove 3 is set to 10 degrees relative to a line parallel to the axis of the cylinder bore 2 while an angle defined between the bottom surface portion 3A and the lateral surface portion 3B is set to 80 degrees, the following can be stated. That is, as shown in FIG. 9, when the piston seal 1 is fitted into the sealing groove 3, a clearance C will exist between the bottom surface portion 3A and the piston seal 1, as well as between the lateral surface portion 3B and the piston seal 1. This clearance C remains, as shown in FIG. 10, even if the piston 4 is installed into the cylinder bore 2.

In the above condition, if hydraulic pressure is supplied into the cylinder bore 2, the piston seal 1 will be deformed up to an amount defined by the clearance C due to the hydraulic pressure supplied. Accordingly, when the piston seal 1 abuts against the bottom surface portion 3A and the lateral surface portion 3B of the sealing groove 3, hydraulic-pressure variation occurs causing deterioration in brake operationabilities. Especially, disk brakes that apply to autobicycles where no booster is provided while hydraulic pressure is directly generated through manual operations tend to cause deterioration in the brake operationabilities.

Still further, as shown in FIG. 11, for example, in case that an inclined angle of the bottom surface portion 3A of the sealing groove 3 is set to 5 degrees relative to a line parallel to the axis of the cylinder bore 2 while an angle defined between the bottom surface portion 3A and the lateral surface portion 3B is set to 90 degrees, the following can be stated. That is, as shown in FIG. 12, in case that the piston seal 1 is fitted into the sealing groove 3, the bottom surface portion 3A and the lateral surface portion 3B of the sealing groove 3 and the piston seal 1 that is rectangular in section will abut to each other. However, even in this case, as shown in FIG. 13, when the piston 4 is installed into the cylinder bore 2, the piston seal 1 is deformed so as to provide the clearance C between an opening side of the lateral surface portion 3B of the sealing groove 3 and the piston seal 1. Accordingly, also in this case, when hydraulic pressure is supplied into the cylinder bore 2, the piston seal 1 needs to be deformed up to an amount defined by the clearance C thereby causing problems as to deterioration in the brake operationabilities.

SUMMARY OF THE INVENTION

The present invention has been made in light of the above problems, and it is an object of the present invention to provide a disk brake designed to remove a clearance between a piston seal and a sealing groove so as to improve brake operationabilities.

In order to achieve the object described above, according to a first aspect of the present invention, there is provided a disk brake, comprising: a brake pad that is arranged on each side of a disk rotor; a piston that presses the brake pad to the disk rotor; a cylinder bore into which the piston is installed; an annular sealing groove that is formed on an inner periphery of the cylinder bore; and a piston seal that is rectangular in section and is fitted into the sealing groove so as to seal a portion defined between the piston and the cylinder bore, wherein the sealing groove is composed of: a bottom surface portion inclined as the sealing groove expands its diameter as moving toward an opening of the cylinder bore; a lateral surface portion that extends from one end of the bottom surface portion, the one end being a side where the sealing groove has the maximum diameter; and a chamfered portion that is provided between the lateral surface portion and the inner periphery of the cylinder bore, the chamfered portion being formed as the opening of the sealing groove is expanded in an axial direction of the cylinder bore, and wherein an inclined angle of the bottom surface portion relative to an axis of the cylinder bore is set to 2 to 8 degrees, an angle defined between the bottom surface portion and the lateral surface portion is set to 82 to 89 degrees, and in a condition where the piston is installed into the cylinder bore, the piston seal is adapted to abut against the bottom surface portion and the lateral surface portion of the sealing groove.

Further, according to a second aspect of the present invention, there is provided a disk brake, comprising: a brake pad that is arranged on each side of a disk rotor; a piston that presses at least one of the brake pads to the disk rotor; a cylinder bore into which the piston is slidably installed; a sealing groove that is formed on an inner periphery of the cylinder bore; and a piston seal that is rectangular in section and fitted into the sealing groove so as to seal a portion defined between the piston and the cylinder bore, wherein the sealing groove is provided with a bottom surface portion that is inclined at angle of 2 to 8 degrees relative to a line parallel to a central line of the cylinder bore in an axial direction as a diameter of the sealing groove is expanded as moving toward an opening of the cylinder bore; the sealing groove is also provided with a lateral surface portion formed on a side where the cylinder bore is opened, the lateral surface portion being set to 0 degree relative to a surface that is orthogonal to the central line of the cylinder bore in an axial direction, or being set to angle of 0 to 4 degrees so as to make the sealing groove expanded as moving toward an opening of the sealing groove; and the angle of the lateral surface portion relative to the surface that is orthogonal to the central line of the cylinder bore in an axial direction is set to be smaller than the angle of the bottom surface portion relative to the line parallel to the central line of the cylinder bore in an axial direction.

Still further, according to a third aspect of the present invention, there is provided a disk brake, comprising: a brake pad that is arranged on each side of a disk rotor; a piston that presses the brake pad to the disk rotor; a cylinder bore into which the piston is slidably installed; an annular sealing groove that is formed on an inner periphery of the cylinder bore; and a piston seal that is rectangular in section and is fitted into an opening of the sealing groove so as to seal a portion defined between the piston and the cylinder bore, wherein the sealing groove is composed of: a bottom surface portion inclined as the sealing groove expands its diameter as moving toward an opening of the cylinder bore; a lateral surface portion that extends from one end of the bottom surface portion, the one end being a side where the sealing groove has the maximum diameter; and a chamfered portion that is provided between the lateral surface portion and the inner periphery of the cylinder bore, the chamfered portion being formed as the opening of the sealing groove is expanded in an axial direction of the cylinder bore, and wherein the lateral surface portion of the sealing groove is formed as that the whole external peripheral surface of the piston seal abuts to the bottom surface portion of the sealing groove while the whole lateral surface portion of the sealing groove abuts to a lateral surface of the piston seal in a condition where the piston seal and the piston are both installed into the cylinder bore.

BRIEF DESCRIPTION OF THE DRAWINGS

FIG. 6 introduces some charts where a contact condition between the piston seal and the sealing groove is individually shown based on each of the inclined angles of the bottom surface portion and the lateral surface portion of the sealing groove of the disk brake according to the first embodiment of the present invention, the contact condition being also categorized according to each of interferences of the piston seal;

FIG. 7 is a chart where each of the individual charts introduced in FIG. 6 is brought together;

DETAILED DESCRIPTION OF THE PREFERRED EMBODIMENTS

Figure 2:
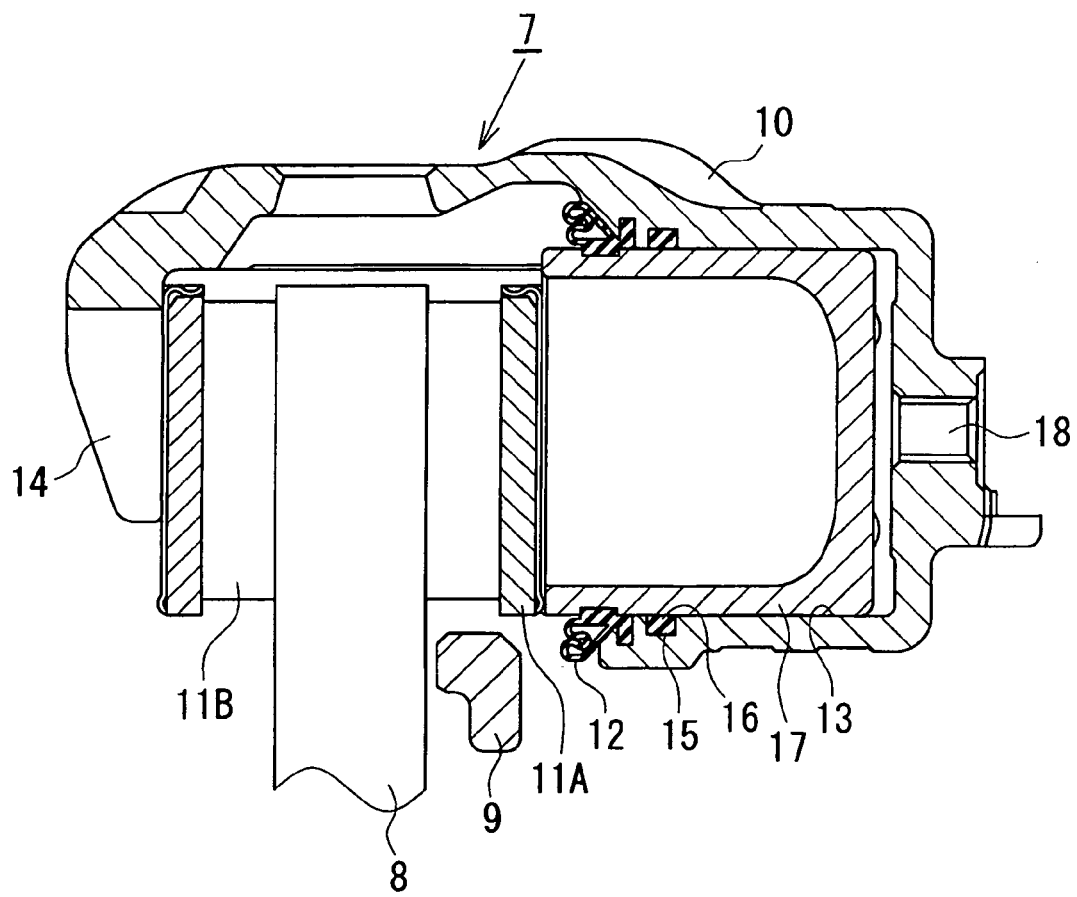
FIG. 2 is a longitudinal section of a floating-caliper disk brake according to the first embodiment of the present invention.

Preferred embodiments of the present invention will be described with reference to the accompanying drawings. Referring to FIG. 2, a disk brake 7 according to an embodiment of the present invention is categorized into a floating-caliper disk brake, and comprises: a disk rotor 8 that is rotated together with wheels; a carrier 9 that is fixed on a side of a vehicle body; a caliper main body 10 that is movably supported in an axial direction of the disk rotor 8 relative to the carrier 9; and a pair of brake pads 11A, 11B that is arranged at each side of the disk rotor 8 and movably supported in an axial direction of the disk rotor 8 by means of the carrier 9.

The caliper main body 10 is provided with a cylinder bore 13 that faces one of the brake pads, the brake pad 11A, the caliper main body 10 being also integrally formed with a claw portion 14 that overstrides the disk rotor 8 so as to face the other brake pad, the brake pad 11B. A sealing groove 15 is provided on an inner peripheral surface of and on an opening side of the cylinder bore 13, the sealing groove 15 being formed externally in a radial direction of the disk rotor 8 so as to form an annular concavity. A piston seal (or sealing member) 16 is installed into the sealing groove 15, and a piston 17 is slidably inserted into the cylinder bore 13 through the piston seal 16. Further, a dust boot 12 is provided between a marginal opening of the cylinder bore 13 and the piston 17. On a bottom-sided portion of the cylinder bore 13, a port 18 for supplying hydraulic pressure into the cylinder bore 13 is provided.

When the hydraulic pressure is supplied from a pressure source such as a master cylinder, etc. to the interior of the cylinder bore 13 through the port 18, the piston 17 moves forward so as to press the brake pad 11A to the disk rotor 8. With its counterforce, the caliper main body 10 is adapted to move whereby the claw portion 14 presses the other side of the brake pad, the brake pad 11B to the disk rotor 8 so as to produce braking force. When the hydraulic pressure from the pressure source is released, the piston 17 moves backward, whereby the brake pads 11A, 11B will move away from the disk rotor 8 so as to release the braking force.

Figure 3:
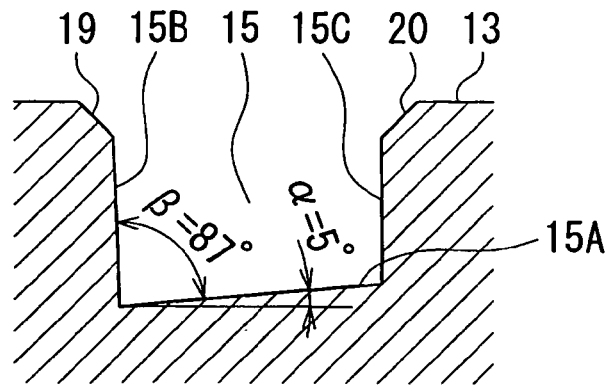
FIG. 3 is a longitudinal section of a sealing groove illustrated in FIG. 1.

Next, explanation in detail will be made on the sealing groove 15 of the caliper main body 10 and the piston seal 16 with reference to FIG. 1. Considering the sealing groove 15, its dimension in an axial direction of the disk rotor 8 is set to be larger than the piston seal 16 while its bottom surface portion 15A inclines as that a diameter of the sealing groove 15 becomes expanded as moving toward an opening of the cylinder bore 13 (left side in FIG. 1) so as to form a tapered configuration. As shown in FIG. 3, in the sealing groove 15, an inclined angle α of the bottom surface portion 15A in an axial direction of the cylinder bore 13 is set to 5 degrees while an angle β defined between the bottom surface portion 15A and a lateral surface portion 15B placed on an opening side of the cylinder bore 13 (left side in FIG. 3) is set to 87 degrees. Hereinafter, the lateral surface portion 15B will be optionally defined as the first lateral surface portion 15B. A lateral surface portion 15C of the sealing groove 15 placed on a bottom portion side of the cylinder bore 13 is formed to be perpendicular relative to an axis of the cylinder bore 13. Hereinafter, the lateral surface portion 15C will be optionally defined as the second lateral surface portion 15C. Further, chamfered portions 19, 20 are respectively formed on marginal portions of the first and second lateral surface portions 15B, 15C of the sealing groove 15.

Figure 4:
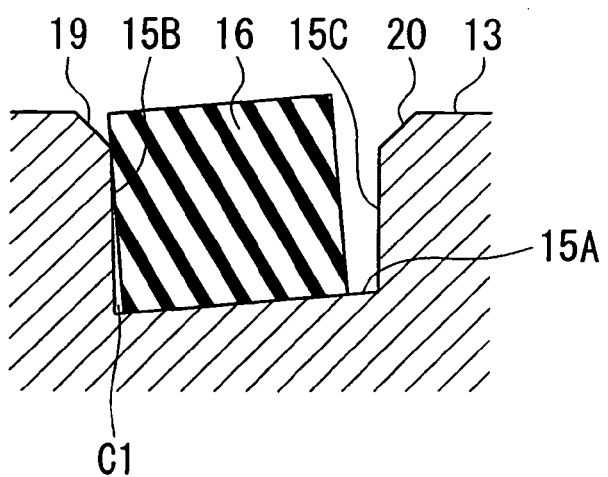
FIG. 4 is a longitudinal section in a condition where the piston seal is installed into the sealing groove illustrated in FIG. 3.

The piston seal 16 is made of an elastic material such as EPDM (ethylene-propylene rubber) and is formed into a ring member that is rectangular in section, meaning approximately oblong or foursquare in section (see FIG. 4). Further, the piston seal 16 is composed of: an external peripheral surface 16A that abuts to the bottom surface portion 15A of the sealing groove 15; a lateral surface 16B that abuts to the first lateral surface portion 15B of the sealing groove 15; a lateral surface 16C that faces the second lateral surface portion 15C; and an inner peripheral surface 16D that abuts to the piston 17. Hereinafter, the lateral surface 16B and the lateral surface 16C will be optionally defined as the first lateral surface 16B and the second lateral surface 16C, respectively.

As shown in FIG. 4, when the piston seal 16 is fitted into the sealing groove 15, the piston seal 16 abuts against the first lateral surface portion 15B due to the inclination of the bottom surface portion 15A of the sealing groove 15. Accordingly, the piston seal 16 is deformed along the inclination of the bottom surface portion 15A whereby an inner peripheral surface of the piston seal 16 becomes tapered. Here, an angle β defined between the bottom surface portion 15A and the first lateral surface portion 15B of the sealing groove 15 is set to 87 degrees. Since the piston seal 16 is rectangular in section, a clearance C1 will be made between the piston seal 16 and the first lateral surface portion 15B of the sealing groove 15, the clearance C1 being rather placed on a side of the bottom portion 15A.

Figure 1:
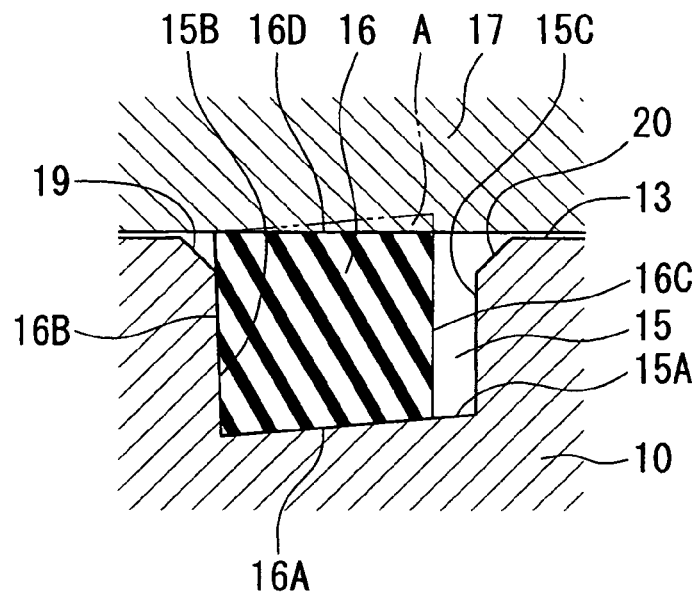
FIG. 1 is a longitudinal section that expands a sealed portion formed by a piston seal of a disk brake according to a first embodiment of the present invention.

In this condition, when the piston 17 is installed into the cylinder bore 13, as shown in FIG. 1, the inner peripheral surface of the piston seal 16 is deformed into taper and pressed by the piston 17 whereby the clearance C1 is removed. Accordingly, the external peripheral surface 16A of the piston seal 16 is pressed and abut against the bottom surface portion 15A of the sealing groove 15 while the first lateral surface 16B of the piston seal 16 is pressed and abut against the first lateral surface portion 15B of the sealing groove 15.

In braking operation, the piston seal 16 will be elastically deformed in a left-sided direction along the chamfered portion 19 while the piston 17 moves forward by hydraulic pressure that is supplied from the port 18 to the interior of the cylinder bore 13. On the other hand, when the braking operation is released, the piston 17 is adapted to move backward in a right-sided direction due to a rollback function to which the elastic quality of the piston seal 16 is participated Still further, in case that the brake pads 11A, 11B are worn out, the piston 17 moves forward during the braking operation only for an amount defined by the wear of the brake pads 11A, 11B. Here, when the piston 17 moves forward, the piston 17 is adapted to slip on the piston seal 16. Accordingly, it is possible to compensate the wear of the brake pads 11A, 11B so as to make a pad clearance adjustable to a constant amount.

In the piston seal 16, due to the inclination of the bottom surface portion 15A of the sealing groove 15, the inner peripheral surface 16D thereof will be tapered [meaning that the inner peripheral surface 16D inclines to expand a diameter of the piston seal 16 as moving toward the opening of the cylinder bore 2 (left side in FIG. 1)]. Accordingly, it is possible to enhance adhesive properties between the piston 17 and the piston seal 16 while being able to reduce sliding-resistance therebetween. Further, in the sealing groove 15, an inclined angle α of the bottom surface portion 15A relative to an axis of the cylinder bore 13 is set to 5 degrees while an angle β defined between the bottom surface portion 15A and the first lateral surface portion 15B on the opening side of the cylinder bore 13 is set to 87 degrees. Accordingly, in a condition where the piston 16 is installed in the cylinder bore 13, it is possible that both of the external peripheral surface 16A and the first lateral surface 16B of the piston seal 16 respectively abut to the bottom surface portion 15A and the first lateral surface portion 15B of the sealing groove 15 thereby removing the clearance C1 therebetween. With this structure, it is possible to reduce undesirable deformation of the piston seal 16 due to hydraulic pressure during braking so as to improve brake operationabilities while inhibiting hydraulic pressure variation. Considering the shape of the sealing groove 15, there will be no need to worry about undercut, so that easy mechanical work will be applicable to the sealing groove 15 by using, for example, forming tools.

Still further, when the piston 17 is installed into the cylinder bore 13, the clearance C1 may slightly exist between the piston seal 16 and the bottom surface portion 15A of the sealing groove 15 as well as between the piston seal 16 and the first lateral surface portion 15B of the sealing groove 15. However, by abutting the piston seal 16 once to both the bottom surface portion 15A and the first lateral surface portion 15B of the sealing groove 15 while supplying predetermined hydraulic pressure into the cylinder bore 13, it is possible to secure a contact condition between the piston seal 16 and the sealing groove 15.

Figure 5:
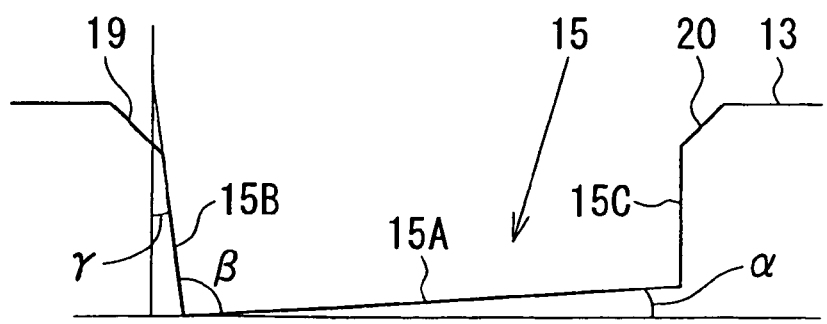
FIG. 5 shows an inclined angle of a bottom surface portion and a lateral surface portion of the sealing groove of the disk brake according to the first embodiment of the present invention.
Figure 8:
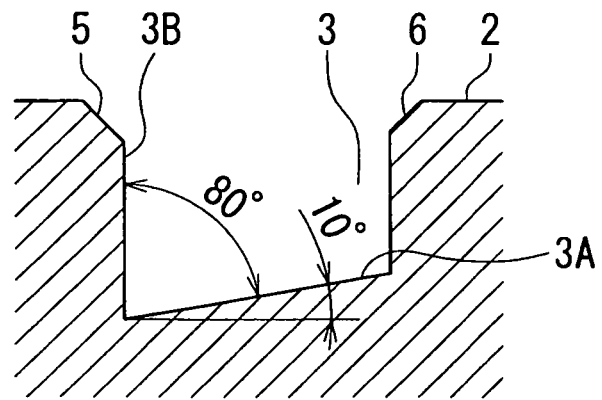
FIG. 8 is a longitudinal section that expands a sealing groove of a conventional disk brake.
Figure 9:
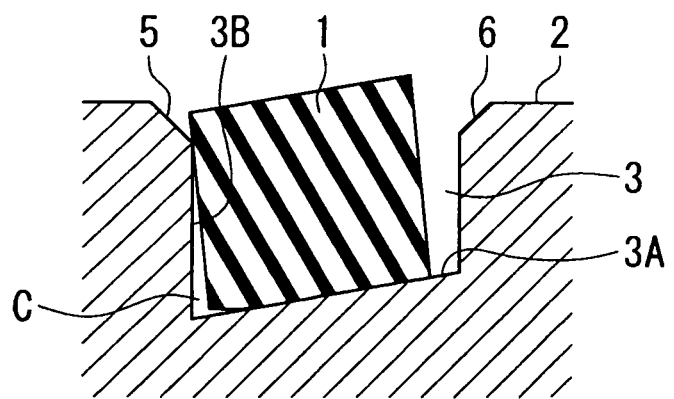
FIG. 9 is a longitudinal section in a condition where a piston seal is installed into the sealing groove of FIG. 8.
Figure 10:
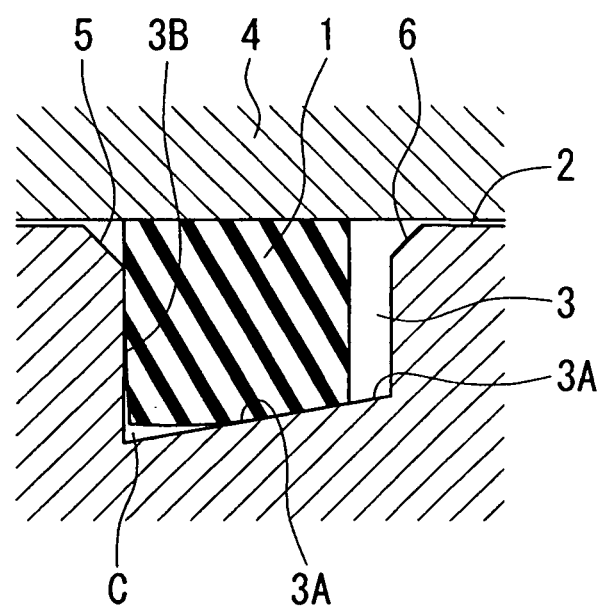
FIG. 10 is a longitudinal section where a piston is installed into a cylinder bore in a condition of FIG. 9.
Figure 11:
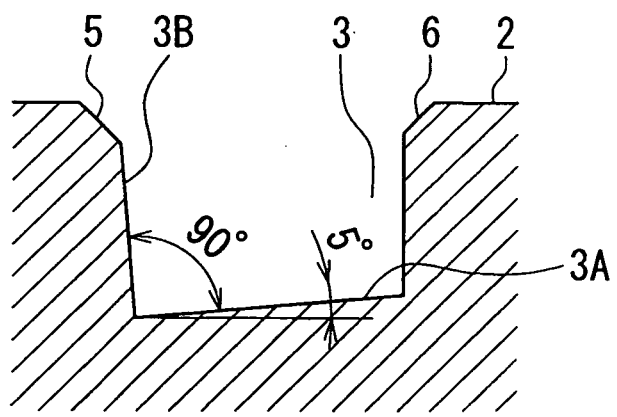
FIG. 11 is a longitudinal section that expands a sealing groove of another conventional disk brake.
Figure 12:
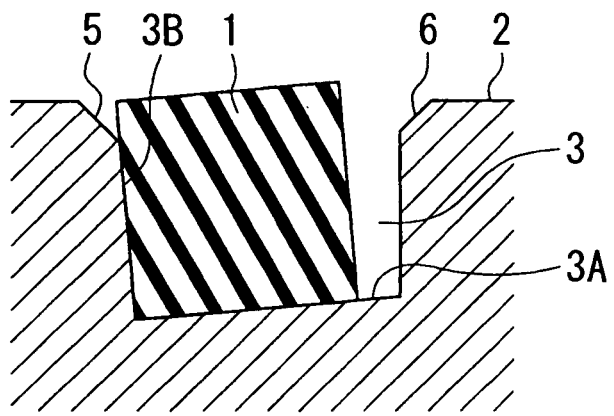
FIG. 12 is a longitudinal section in a condition where a piston seal is installed into the sealing groove of FIG. 11.
Figure 13:
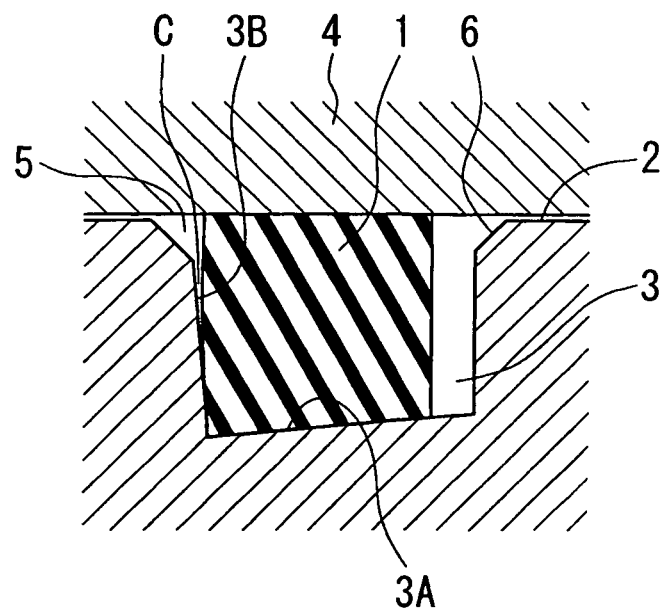
FIG. 13 is a longitudinal section where a piston is installed into a cylinder bore in a condition of FIG. 12.

In this embodiment, the inclined angle α of the bottom surface portion 15A of the sealing groove 15 relative to an axis of the cylinder bore 13 is set to 5 degrees while the angle β defined between the bottom surface portion 15A and the first lateral surface portion 15B is set to 87 degrees. However, these values defined are only one of the optimal values. These inclined angles α and β may be applied with another values as long as a favorable contact condition is obtainable between the piston seal 16 and the bottom surface portion 15A as well as between the piston seal 16 and the first lateral surface portion 15B. Hereinafter, by mainly referring to FIGS. 6 and 7, the inclined angle α of the bottom surface portion 15A of the sealing groove 15 relative to an axis of the cylinder bore 13, the angle β defined between the bottom surface portion 15A and the first lateral surface portion 15B, an angle γ (see FIG. 5) of the first lateral surface portion 15B relative to a surface orthogonal to an axis of the cylinder bore 13, and a contact condition of the piston seal 16 relative to both the bottom surface portion 15A and the first lateral surface portion 15B of the sealing groove 15 will be discussed.

In the disk brake 7, supposing that the piston 17 has a diameter of 32 mm, the piston seal 16 has a measurement of 2.8 mm×3.2 mm in a rectangular section and is made of EPDM (ethylene-propylene rubber) with its hardness of 75 IRHD (International Rubber Hardness Degree). A deformation amount of the piston seal 16 when the piston 17 is installed into the cylinder bore 13 is shown with "interferences (%)." More specifically, the interferences are described in percentages defined by a cross sectional area of the piston seal 16 that is deformed following installation of the piston 17 (a portion A surrounded by a virtual line and the external periphery of the piston 17 in FIG. 1) relative to a cross sectional area of the piston seal 16 prior to installation of the piston 17. Here, the definition of the interferences is based on a condition where the piston seal 16 is abutted to both the bottom surface portion 15A and the first lateral surface portion 15B of the sealing groove 15. In each of the interferences 2%, 3%, 4%, and 5%, the inclined angle α of the bottom surface portion 15A is set to 2 to 10 degrees rising one degree at a time, and the angle β defined between the bottom surface portion 15A and the first lateral surface portion 15B is set to 80 to 90 degrees rising one degree at a time. In each of the cases, a contact condition between the piston seal 16 and the bottom surface portion 15A of the sealing groove 15 as well as between the piston seal 16 and the first lateral surface portion 15B of the sealing groove 15 will be studied. In the study, the piston seal 16 is installed into the sealing groove 15, and the piston 17 is mounted in the cylinder bore 13. Then, hydraulic pressure based on predetermined empirical pressure is once supplied to the interior of the cylinder bore 13, and then the hydraulic pressure is released. Here, this predetermined empirical pressure can be achieved through that the interior of the cylinder bore 13 is pressurized for one second at 1.5 Mpa, the interior of the cylinder bore 13 is then depressurized for one second, and this process is repeated by three times. Moreover, the contact condition will be determined if a clearance exists through visual observation.

Here, in case that the interference is under 2%, a sealing quality will be insufficient, and the clearance between the piston seal 16 and the bottom surface portion 15A of the sealing groove 15 as well as between the piston seal 16 and the first lateral surface portion 15B of the sealing groove 15 will enlarge so as to deteriorate brake operationabilities. On the other hand, in case that the interference is beyond 5%, not only sliding resistance of the piston 17 becomes enlarged so as to deteriorate the brake operationabilities, but also permanent deformation tends to occur in the piston seal 16 thus increasing possibilities to impair a sealing quality and a rollback function. Accordingly, it will be preferable for the interference to be 3 to 5%, most preferably to be approximately 4%.

Simulated results based on the above condition are shown with reference to FIGS. 6 and 7. FIG. 6 shows each of the results based on the interferences. FIG. 7 arranges the results of the FIG. 6 in one chart. In both FIG. 6 and FIG. 7, a symbol ○ indicates that contact condition is satisfied while a symbol × indicates that contact condition is not satisfied. In FIG. 6, a numerical value next to each of the symbols denote the angle γ of the first lateral surface portion 15B of the sealing groove 15 relative to a surface that is orthogonal to an axial direction of the cylinder bore 13 (see FIG. 5). In FIG. 7, each section of the angle β is divided into 4 rows. These 4 rows denote the interferences 2%, 3%, 4% and 5% in left-to-right order. Furthermore, in FIGS. 6 and 7, as to a range where the sum of the inclined angle α of the bottom surface portion 15A and the angle β defined between the bottom surface portion 15A and the first lateral surface portion 15B is under 90 degrees (α+β<90 degrees), the sealing groove 15 is formed into an undercut shape that will cause machinery works exceedingly difficult. Accordingly, the range is excluded from the studies.

The following can be found from the FIGS. 6 and 7. (1) the inclined angle α of the bottom surface portion 15A of the sealing groove 15 is set to 2 to 8 degrees while the angle β defined between the bottom surface portion 15A and the first lateral surface portion 15B is set to 82 to 89 degrees. In a condition where the piston 17 is mounted into the cylinder bore 13, it will be preferable to set the interference between the piston 17 and the piston seal 16 while making the piston seal 16 abutted against the bottom surface portion 15A and the first lateral surface portion 15B of the sealing groove 15.

(2) Based on (1), the inclined angle α of the bottom surface portion 15A of the sealing groove 15 is set to 2 to 5 degrees. In this condition it will be preferable to set the interference between the piston 17 and the piston seal 16 to 2 to 5%.

(3) Based on (2), it will be preferable to set the angle β defined between the bottom surface portion 15A and the first lateral surface portion 15B to 85 to 89 degrees.

(4) Based on (2), the inclined angle α of the bottom surface portion 15A of the sealing groove 15 is set to 3 degrees while the angle β defined between the bottom surface portion 15A and the first lateral surface portion 15B is set to 89 degrees. In this condition, it will be preferable to set the interference between the piston 17 and the piston seal 16 to be larger than 2%.

(5) Based on (2), the inclined angle α of the bottom surface portion 15A of the sealing groove 15 is set to 4 degrees while the angle β defined between the bottom surface portion 15A and the first lateral surface portion 15B is set to 89 degrees. In this condition, it will be preferable to set the interference between the piston 17 and the piston seal 16 to be larger than 3%.

(6) Based on (2), the inclined angle α of the bottom surface portion 15A of the sealing groove 15 is set to 5 degrees while the angle β defined between the bottom surface portion 15A and the first lateral surface portion 15B is set to 89 degrees. In this condition, it will be preferable to set the interference between the piston 17 and the piston seal 16 to be larger than 4%.

(7) Based on (2), the inclined angle α of the bottom surface portion 15A of the sealing groove 15 is set to 5 degrees while the angle β defined between the bottom surface portion 15A and the first lateral surface portion 15B is set to 88 degrees. In this condition, it will be preferable to set the interference between the piston 17 and the piston seal 16 to be larger than 3%.

(8) Based on (2), it will be preferably set the angle β defined between the bottom surface portion 15A and the first lateral surface portion 15B to 85 to 88 degrees.

(9) Based on (8), it will be preferably set the angle γ defined between the first lateral surface portion 15B of the sealing groove 15 and a surface that is orthogonal to an axial direction of the cylinder bore 13 to 0 to 2 degrees.

(10) Based on (2), it will be preferably set the angle β defined between the bottom surface portion 15A and the first lateral surface portion 15B to 85 to 87 degrees.

(11) Based on (10), it will be preferably set the angle γ defined between the first lateral surface portion 15B of the sealing groove 15 and a surface that is orthogonal to an axial direction of the cylinder bore 13 to 0 to 2 degrees.

(12) Based on (2), it will be preferable that the inclined angle α of the bottom surface portion 15A of the sealing groove 15 is set to 3 to 5 degrees while the angle β defined between the bottom surface portion 15A and the first lateral surface portion 15B is set to 87 degrees.

(13) Based on (12), it will be preferably set the inclined angle α of the bottom surface portion 15A of the sealing groove 15 to 5 degrees.

(14) Based on (1), the inclined angle α of the bottom surface portion 15A of the sealing groove 15 is set to 2 to 8 degrees while the angle β defined between the bottom surface portion 15A and the first lateral surface portion 15B is set to 82 to 89 degrees. The angle γ defined between the first lateral surface portion 15B and a surface orthogonal in an axial direction of the cylinder bore 13 is set to 0 to 4 degrees. In this condition, it will be preferable to set the interference between the piston 17 and the piston seal 16 to 5%.

As discussed hereinabove, the sealing groove 15 is composed of: the bottom surface portion 15A that makes the diameter of the sealing groove 15 expanded as moving toward the opening of the cylinder bore 13; the first lateral surface portion 15B that extends from the most marginal portion of the bottom surface portion 15A toward the opening of the sealing groove 15; and the chamfered portion 19 that is provided between the first lateral surface portion 15B and the inner periphery of the cylinder bore 13, the chamfered portion 19 being formed as that the opening of the sealing groove 15 makes expanded in an axial direction of the cylinder bore 13. The piston seal 16 and the piston 17 are installed into the cylinder bore 13 while hydraulic pressure based on predetermined empirical pressure is applied. In this condition, the external peripheral surface 16A of the piston seal 16 is completely abutted against the bottom surface portion 15A of the sealing groove 15 while the whole surface of the first lateral surface portion 15B is abutted against the first lateral surface 16B of the piston seal 16. The sealing groove 15 is formed as hereinabove discussed whereby it will be certainly possible to remove the clearance between the piston seal 16 and the sealing groove 15 contributing to improvement of a brake operationability.

In the above embodiments, the floating-caliper disk brake has been discussed as one example. However, the present invention is not limited thereto, but surely applicable to other types of hydraulic disk brake such as a fixed-caliper disk brake, etc.

What is claimed is:

1. A disk brake, comprising:
a brake pad that is arranged on each side of a disk rotor;
a piston that presses the brake pad to the disk rotor;
a cylinder bore into which the piston is installed;
an annular sealing groove that is formed on an inner periphery of the cylinder bore; and
a piston seal that is rectangular in section and is fitted into the sealing groove so as to seal a portion defined between the piston and the cylinder bore,
wherein the sealing groove is composed of: a bottom surface portion inclined as the sealing groove expands its diameter as moving toward an opening of the cylinder bore; a lateral surface portion that extends from one end of the bottom surface portion, the one end being a side where the sealing groove has the maximum diameter; and a chamfered portion that is provided between the lateral surface portion and the inner periphery of the cylinder bore, the chamfered portion being formed as the opening of the sealing groove is expanded in an axial direction of the cylinder bore, and
wherein an inclined angle of the bottom surface portion relative to an axis of the cylinder bore is set to 2 to 5 degrees, an angle defined between the bottom surface portion and the lateral surface portion is set to 85 to 88 degrees, and in a condition where the piston is installed into the cylinder bore, the piston seal is adapted to abut against the bottom surface portion and the lateral surface portion of the sealing groove.

2. The disk brake according to claim 1, wherein the lateral surface portion is formed at 0 degree relative to a radial surface that is orthogonal to the central line of the cylinder bore in an axial direction, or formed at angle of 0 to 3 degrees so as to make the sealing groove expanded as moving toward an opening of the sealing groove.

3. The disk brake according to claim 2, wherein the lateral surface portion of the sealing groove on a side where the cylinder bore is opened is formed at angle of 85 to 87 degrees relative to the bottom surface portion of the sealing groove.

4. The disk brake according to claim 3, wherein the bottom surface portion of the sealing groove is inclined at angle of 3 to 5 degrees relative to the line parallel to the central line of the cylinder bore in an axial direction.

5. The disk brake according to claim 4, wherein the lateral surface portion of the sealing groove on a side where the cylinder bore is opened is formed at angle of 87 degrees relative to the bottom surface portion of the sealing groove.

6. The disk brake according to claim 2, wherein the lateral surface portion on a side where the cylinder bore is opened is formed at 0 degree relative to the radial surface of the cylinder bore, or formed at 1 degree as the sealing groove is expanded as moving toward the opening of the sealing groove.

7. The disk brake according to claim 6, wherein, in a condition where the piston is inserted into the cylinder bore, length of the piston seal in a radial direction is reduced by 2 to 5% from natural length of the piston seal.

8. The disk brake according to claim 2, wherein the bottom surface portion of the sealing groove is inclined at angle of 5 degrees relative to the line parallel to the central line of the cylinder bore in an axial direction, and the lateral surface portion on a side where the cylinder bore is opened is set to angle of 2 degrees relative to the surface that is orthogonal to the central line of the cylinder bore in an axial direction as the sealing groove is expanded as moving toward the opening of the sealing groove.

9. The disk brake according to claim 8, wherein, in a condition where the piston is inserted into the cylinder bore, length of the piston seal in a radial direction is reduced by 2 to 5% from natural length of the piston seal.

10. The disk brake according to claim 2, wherein, in a condition where the piston is inserted into the cylinder bore, length of the piston seal in a radial direction is reduced by 4% from natural length of the piston seal.

11. The disk brake according to claim 1, wherein the inclined angle of the bottom surface portion of the sealing groove relative to the axis of the cylinder bore is set to 2 to 5 degrees, and interference defined between the piston and the piston seal is set to 2 to 5%.

12. The disk brake according to claim 11, wherein the angle defined between the bottom surface portion and the lateral surface portion of the sealing groove is set to 85 to 87 degrees.

13. The disk brake according to claim 12, wherein an angle defined between the lateral surface portion of the sealing groove and a surface that is orthogonal to an axial direction of the cylinder bore is set to 0 to 2 degrees as the opening of the sealing groove is expanded.

14. The disk brake according to claim 1,
wherein the lateral surface portion of the sealing groove is formed as that the whole external peripheral surface of the piston seal abuts to the bottom surface portion of the sealing groove while the whole lateral surface portion of the sealing groove abuts to a lateral surface of the piston seal in a condition where the piston seal and the piston are both installed into the cylinder bore.

15. The disk brake according to claim 14, wherein, in a condition where the piston is inserted into the cylinder bore, length of the piston seal in a radial direction is reduced by 2 to 5% from natural length of the piston seal.

16. The disk brake according to claim 14, wherein the bottom surface portion of the sealing groove is inclined at angle of 3 to 5 degrees relative to the line parallel to the axis of the cylinder bore in an axial direction, and the lateral surface portion is formed at angle of 85 to 87 degrees relative to the bottom surface portion of the sealing groove.

17. The disk brake according to claim 14, wherein the lateral surface portion is formed at 0 degree relative to a radial surface that is orthogonal to the axis of the cylinder bore, or formed at angle of 0 to 3 degrees as the sealing groove is expanded as moving toward the opening of the sealing groove.

18. The disk brake according to claim 1, wherein the angle defined between the bottom surface portion and the lateral surface portion of the sealing groove is set to 85 to 87 degrees.

19. The disk brake according to claim 18, wherein an angle defined between the lateral surface portion of the sealing groove and a surface that is orthogonal to an axial direction of the cylinder bore is set to 0 to 2 degrees as the opening of the sealing groove is expanded.

20. The disk brake according to claim 1, wherein, in a condition where the piston is inserted into the cylinder bore, a length of the piston seal in a radial direction is reduced by 4 to 5% from a natural length of the piston seal.

* * * * *